Figure 1:
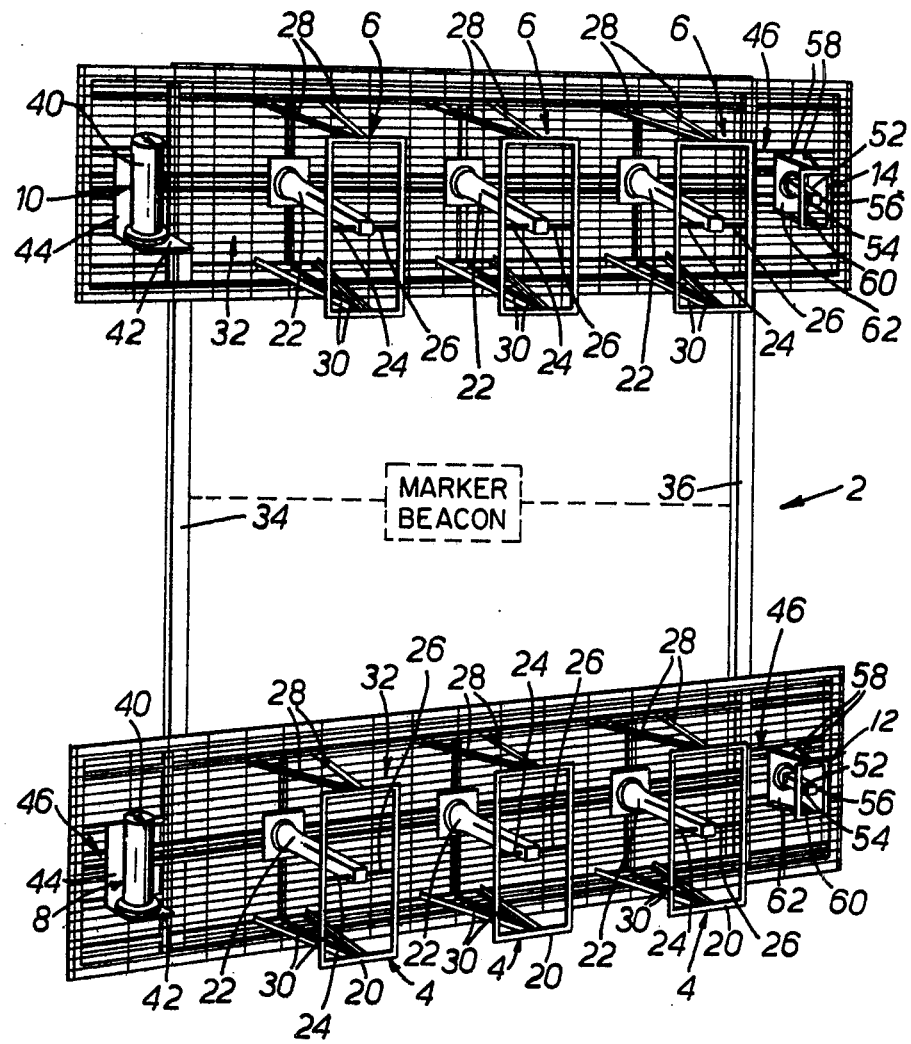

United States Patent [19]

Taylor

[11] 4,093,952
[45] June 6, 1978

[54] GUIDANCE SYSTEMS

[75] Inventor: Frank Howard Taylor, London, England

[73] Assignee: Plessey Handel und Investments AG, Zug, Switzerland

[21] Appl. No.: 723,286

[22] Filed: Sept. 14, 1976

[30] Foreign Application Priority Data

Sept. 16, 1975 United Kingdom ............... 37976/75

[51] Int. Cl.² .......................... G01S 1/10; G01S 1/18
[52] U.S. Cl. ................................ 343/108 R; 343/109; 343/728; 343/742
[58] Field of Search .................. 343/108 R, 742, 728, 343/109; 244/188, 183

[56] References Cited

U.S. PATENT DOCUMENTS

| | | | |
|---|---|---|---|
| 2,434,934 | 1/1948 | Kitzerow | 343/742 X |
| 3,409,890 | 11/1968 | Redlich | 343/108 R |

OTHER PUBLICATIONS

Avionics Navigation Systems, M. Kayton and W. R. Fried, John Wiley & Sons, 1969, pp. 162-163, 528-539.

Primary Examiner—Maynard R. Wilbur
Assistant Examiner—Richard E. Berger
Attorney, Agent, or Firm—Fleit & Jacobson

[57] ABSTRACT

A guidance system for aircraft and ships, which system comprises at least two localizer antenna arrangements which are spaced in elevation above a reflecting surface, at least two distance measuring antenna arrangements which are spaced in elevation above the reflecting surface, and at least two glide slope antenna arrangements which are mounted vertically above each other, the guidance system being such that the localizer antenna arrangements are at a mean height of at least 2½ wavelengths above the reflecting surface and are fed with signals having the same radio frequency but having a phase difference, the distance measuring antenna arrangements are at a mean height of at least 25 wavelengths above the reflecting surface and are fed with signals having the same radio frequency but having a phase difference, and the glide slope antenna arrangements are fed with signals having the same radio frequency but two different frequencies of amplitude modulation to give by reflection from the reflecting surface at least two consecutive glide slopes in the same sense.

11 Claims, 2 Drawing Figures

GUIDANCE SYSTEMS

This invention relates to a guidance system for aircraft and ships.

Accordingly, this invention provides a guidance system for aircraft and ships, which system comprises at least two localiser antenna arrangements which are spaced in elevation above a reflecting surface, at least two distance measuring antenna arrangements which are spaced in elevation above the reflecting surface, and at least two glide slope antenna arrangements which are mounted vertically above each other, the guidance system being such that the localiser antenna arrangements are at a mean height of at least 2½ wavelengths above the reflecting surface and are fed with signals having the same radio frequency but having a phase difference, the distance measuring antenna arrangements are at a mean height of at least 25 wavelengths above the reflecting surface and are fed with signals having the same radio frequency but having a phase difference, and the glide slope antenna arrangements being fed with signals having the same radio frequency but two different frequencies of amplitude modulation to give by reflection from the reflecting surface at least two consecutive glide slopes in the same sense.

The localiser antenna arrangements may be used to give information on the azimuth of the aricraft or ship with respect to the guidance system. The distance measuring antenna arrangements may be used to give information on the distance of the aircraft or ship with respect to the array. The glide slope antenna arrangements may be used to give information on the elevation of the aircraft or ship with respect to the array.

Preferably, each localiser antenna arrangement and each distance measuring antenna arrangement comprises one or more separate antenna. Each localiser antenna arrangement may comprise three separate antennae. The or each antenna is preferably a frame antenna but other types of antenna such for example as a dipole antenna may be used.

Preferably, the two localiser antenna arrangements and the two distance measuring antenna arrangements are spaced vertically above each other.

When the guidance system is to be used for aircraft, such for example as helicopter or fixed wing aircraft, the mean height of the localiser antenna arrangements may be 8 to 9 wavelengths above the reflecting surface, the mean height of the distance measuring antenna arrangements may be 80 to 90 wavelengths above the reflecting surface, and the mean height of the glide slope antenna arrangements may be 24 to 27 wavelengths above the reflecting surface.

When the guidance system is to be used for ships or other sea-going vessels, the mean height of the localiser antenna arrangements may be 2½ to 3 wavelengths above the reflecting surface, the mean height of the distance measuring antenna arrangements may be 25 to 30 wavelengths above the reflecting surface, and the mean height of the glide slope antenna arrangements may be 7½ to 9 wavelengths above the reflecting surface.

The localiser antenna arrangements may be fed with signals having the same radio frequency and amplitude but having a 90° phase difference.

The glide slope antenna arrangements may be fed with equal amplitude signals which are in phase, with the lower glide slope antenna arrangement being fed with carrier ± 90 Hz amplitude modulation and the upper glide slope antenna arrangement being fed with carrier ± 150 Hz amplitude modulation. In an alternative arrangement, the glide slope antenna arrangements may be such that the lower glide slope antenna arrangement is fed with carrier ± 90 Hz and ± 150 Hz amplitude modulation, and the upper glide slope antenna arrangement is fed with ± 90 Hz and ∓ 150 Hz double sidebands suppressed carrier.

Usually, the reflecting surface will be the surface of the sea.

When the guidance system is to be used for guiding helicopters to a landing pad, for example on an oil rig, the guidance system preferably includes a marker beacon adapted to give an indication of proximity to the actual helicopter landing pad, the marker beacon being mounted at the mean height of the guidance system and the radiation being at 75 MHz coded on an inner marker frequency code of 3 KHz and also morse coded for landing pad identification. The morse code for the landing pad identification may be the same or different from the localiser identity code.

Figure 2:
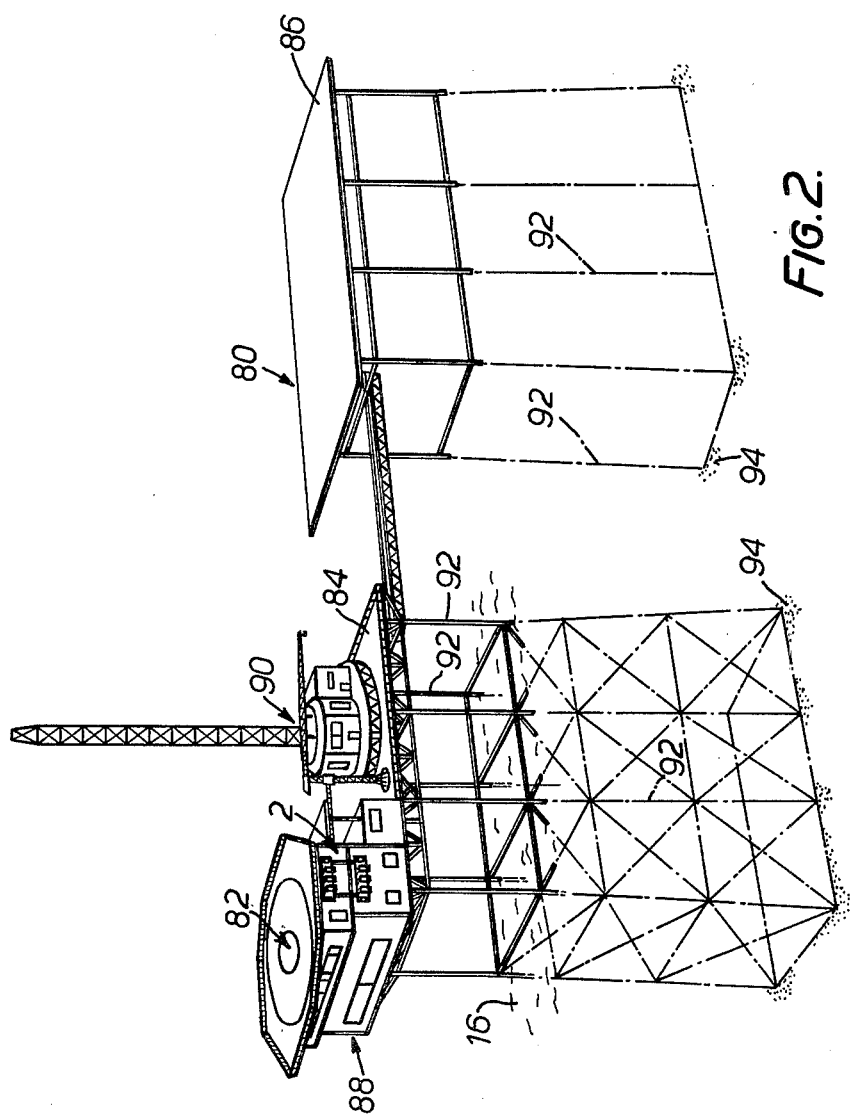

An embodiment of the invention will now be described solely by way of example and with reference to the accompanying drawings in which:

FIG. 1 shows a guidance system in accordance with the invention for a helicopter; and FIG. 2 shows the guidance system of FIG. 1 attached to an oil rig.

Referring to the drawings, there is shown a guidance system 2 comprising first and second localiser antenna arrangements 4, 6 which are mounted vertically above each other; first and second distance measuring antenna arrangements 8, 10 which are mounted vertically above each other; and first and second glide slope antenna arrangements 12, 14 which are mounted vertically above each other. All the antenna arrangements 4, 6; 8, 10 and 12, 14 are also mounted above the sea 16 which constitutes a reflecting surface.

The localiser antenna arrangements 4, 6 are at a mean height of 8 to 9 wavelengths above the surface of the sea 16, the distance measuring antenna arrangements are at a mean height of 80 to 90 wavelengths above the surface of the sea 16, and the glide slope antenna arrangements are at a mean height of 24 to 27 wavelengths above the surface of the sea 16.

The localiser antenna arrangements 4, 6 are fed with signals having the same radio frequency and amplitude but having a 90° phase difference. The lower localiser antenna arrangement 4 may be effective to produce a localiser beam having its maximum amplitude at 1.875° elevation and its first zero at 3.75°. In the elevation plane, this beam will repeat, alternating positive and negative in sign. The upper localiser antenna arrangement 6, as indicated above will be fed with identical signals except that the radio frequency phase will be moved 90°. The aircraft receiver can then take the vector sum of the two signals with the result that the guidance information is rotated in radio frequency phase as the aircraft flies from one lobe to the next one so that there is no change in the guidance information. The localiser antenna arrangements may be effective to provide localiser signal coverage up to 15° elevation whilst still retaining a high signal strength at 1.875° elevation.

The localiser antenna arrangements 4, 6 as shown in FIG. 1 each comprise a frame antenna 20. Each frame antenna 20 is supported at the end of an outwardly projecting pressurised balun 22. Each balun 22 connects to its antenna 20 by means of feed arms 24, 26. A-frame support struts 28, 30 are employed to mount each antenna 20. As shown in FIG. 1, the A-frame support struts 28, 30 are fixed with respect to a back reflector 32. The localiser antenna arrangements 4, 6 are mounted vertically above each other by means of a pair of vertical supports.

The distance measuring antenna arrangements 8, 10 are unidirectional and are each mounted in a fiberglass radome 40. Each radome 40 is mounted on a support platform 42. The platform 42 has an upstanding back plate 44 which is attached to a supporting frame arrangement 46, which frame arrangement 46 is also effective to support the back reflector 32. The distance measuring antenna arrangements 8, 10 may be fed with conventional distance measuring signals. The aircraft may transmit appropriate signals in pulse form to the arrangements 8, 10 and signals may then be transmitted from the arrangements 8, 10 to aircraft by measuring the time between the outgoing and incoming pulses, the distance of the aircraft from the arrangements 8, 10 can be determined.

The glide slope antenna arrangements 12, 14 are fed with equal amplitude signals which are in phase, with the lower glide slope antenna arrangement being fed with carrier ± 90 Hz amplitude modulation and the upper glide slope antenna arrangement being fed with carrier ± 150 Hz amplitude modulation. As shown in FIG. 1, the glide slope antenna arrangements 12, 14 each comprise a frame antenna 50 supported at the end of an outwardly projecting pressurised balun 52. Each balun 52 connects to its antenna 50 by means of feed arms 54, 56. A-frame support struts 58, 60 are employed to mount each antenna 50. The A-frame support struts 58, 60 are fixed with respect to a mounting plate 62 which is itself fixed to the support frame arrangement 46.

The two glide slope antenna arrangements 12, 14 are effective to give two sets of overlapping beams in the elevation phase. Appropriate guide slope aircraft courses may occur at 0.576°, 1.68°, 2.76° and 3.85° with "fly-up" signals from 0° to the first course. The glide slopes can be recognised in a helicopter on a "rate-of-descent" meter as follows:

at 50 Knots, Glide Slope No. 1 — 0.576°; 50 Ft/Min
50 Knots, Glide Slope No. 2 — 1.68°; 148.5 Ft/Min
50 Knots, Glide Slope No. 3 — 2.76°; 244 Ft/Min
50 Knots, Glide Slope No. 4 — 3.85°; 340 Ft/Min Between glide slopes, under ideal calm sea conditions, the carriers plus sidebands will be received 180° out of phase. This results in carrier cancellation but the sidebands remain. Due to lack of carrier, an indicator (e.g. a "flag indication" in a helicopter) will be operated, thus indicating transition from one glide slope to the next. Under more turbulent sea conditions, the carriers will not completely cancel with the result that the indicator will move from a full "fly down" to a full "fly up" position between courses and the indicator may not show due to the receiver time constant.

The four above mentioned glide slopes will all lead to the glide slope antenna arrangements 12, 14. When the guidance system 2 is mounted on an oil rig 80 as shown in FIG. 2, the helicopter can be guided on to a helicopter pad 82. The following flight procedure is recommended.

At maximum range, the helicopter will be below the first course and so will receive "fly up" signals. Assuming level flight, the pilot will approach the first glide slope course which he can follow at a rate of descent of 50 ft/min. He can opt to fly through this course to the second glide slope course, which he can identify by a rate of descent of 148.5 ft/min. Assuming the pilot stays on this second course, he will descend to the approximate height and then carry on level flight. On approaching the rig 80, the pilot will receive a "fly up" signal due to approaching the "near field" radiation from the antenna system. When indication attains full scale reading, conditions should be such that visual contact with the pad 82 has been established. Because the reflection areas increase with decrease of elevation angle, the stability of the lower glide slopes is higher.

The remainder of the oil rig 80 is not relevant to the present invention but it may be mentioned that the rig has two platforms 84, 86 of known type and purpose. FIG. 2 shows arranged on the platform 84, personnel quarters 88 and a derrick arrangement 90. The platforms 84, 86 are supported on legs which are appropriately braced and which rest on the sea bed 94.

It is to be appreciated that the embodiment of the invention described above has been given by way of example only and modifications may be effected. Thus, for example, another guidance system 2 may be arranged on the other side of the pad 82 to enable dual guidance. As shown in FIG. 2, the guidance system or systems 2 will be arranged below the level of the pad 82 so as not to present an obstruction to the incoming helicopter or other aircraft.

If desired, the guidance system 2 shown in FIG. 1 may also include a marker beacon (not shown) which may be fitted centrally of the arrangement 2, i.e. at its mean height. The marker beacon may give an indication of proximity to the actual pad 82. It may radiate at 75 mHz coded on an inner marker frequency code of 3 KHz. The marker beacon may also be morse coded for pad identification and this code can be the same as or different from the localiser identity code.

What I claim is:

1. A guidance system for aircraft and ships, which system comprises at least two localiser antenna arrangements which are spaced in elevation above a reflecting surface, at least two distance measuring antenna arrangements which are spaced in elevation above the reflecting surface, and at least two glide slope antenna arrangements which are mounted vertically above each other, means for mounting said antenna arrangements on a common support structure such that the localiser antenna arrangements are at a mean height of at least 2½ wavelengths above the reflecting surface and are fed with signals having the same radio frequency but having a phase difference, the distance measuring antenna arrangements are at a mean height of at least 25 wavelengths above the reflecting surface and are fed with signals having the same radio frequency but having a phase difference, and the glide slope antenna arrangements are fed with signals having the same radio frequency but two different frequencies of amplitude modulation to give by reflection from the reflecting surface at least two consecutive glide slopes in the same sense.

2. A guidance system according to claim 1, in which each localiser antenna arrangement and each distance measuring antenna arrangement comprises one or more separate antenna.

3. A guidance system according to claim 2 in which the or each antenna is a frame antenna.

4. A guidance system according to claim 1, which is for aircraft and in which the mean height of the localiser antenna arrangements is 8 to 9 wavelengths above the reflecting surface, the mean height of the distance measuring antenna arrangements is 80 to 90 wavelengths above the reflecting surface, and the mean height of the glide slope antenna arrangements is 24 to 27 wavelengths above the reflecting surface.

5. A guidance system according to claim 1, which is for ships, and in which the mean height of the localiser antenna arrangements is 2½ to 3 wavelengths above the reflecting surface, the mean height of the distance measuring antenna arrangements is 25 to 30 wavelengths above the reflecting surface, and the mean height of the glide slope antenna arrangements is 7½ to 9 wavelengths above the reflecting surface.

6. A guidance system according to claim 1, in which the localiser antenna arrangements are fed with signals having the same radio frequency and amplitude but having a 90° phase difference.

7. A guidance system according to claim 1, in which the said glide slope antenna arrangements are fed with equal amplitude signals which are in phase, with the lower glide slope antenna arrangement being fed with carrier ± 90 Hz amplitude modulation and the upper glide slope antenna arrangement being fed with carrier ± 150 Hz amplitude modulation.

8. A guidance system according to claim 1, in which the said glide slope antenna arrangements are such that the lower glide slope antenna arrangement is fed with carrier ± 90 Hz and ± 150 Hz amplitude modulation, and the upper glide slope antenna arrangement is fed with ± 90 Hz and ∓ 150 Hz double sidebands suppressed carrier.

9. A guidance system according to claim 1, which is for a helicopter and which includes a marker beacon for giving an indication of proximity to the helicopter landing pad, the marker beacon being mounted at the mean height of the guidance system and the radiation being at 75 MHz and coded on an inner marker frequency code of 3 KHz, and the marker beacon being morse coded for the helicopter pad identification.

10. A guidance system according to claim 9, in which the morse code for the pad identification is the same as the localiser identity code.

11. A guidance system according to claim 1 wherein a distance measuring antenna arrangement, a localiser antenna arrangement, and a guide slope antenna arrangement are mounted at the same height above the reflecting surface.

* * * * *